June 14, 1949.  A. C. FLETCHER ET AL  2,473,419
ALTERNATING CURRENT RECTIFIER
Filed Jan. 14, 1946  2 Sheets-Sheet 1

INVENTORS,
Albert C. Fletcher
Donald Lloyd
BY
ATTORNEYS.

June 14, 1949.  A. C. FLETCHER ET AL  2,473,419
ALTERNATING CURRENT RECTIFIER

Filed Jan. 14, 1946  2 Sheets-Sheet 2

INVENTORS.
Albert C. Fletcher
Donald Lloyd
BY *Lancaster, Allen & Rommel*
ATTORNEYS.

Patented June 14, 1949

2,473,419

UNITED STATES PATENT OFFICE 2,473,419

ALTERNATING CURRENT RECTIFIER

Albert C. Fletcher and Donald Lloyd,
Oklahoma City, Okla.

Application January 14, 1946, Serial No. 641,044

14 Claims. (Cl. 175—366)

1

This invention relates to rectifiers for alternating current of the dry plate type and more particularly to improvements in the method of assemblage and stacking of the dry plates together with improved current collecting elements for contacting the rectifying surfaces of the plates and for paralleling a plurality of plate units in a rectifier organization.

Among the objects of the invention, one is to provide improved current collecting means for accumulating and collecting the current simultaneously from the various sections of the outer conducting surface of a rectifier plate. Heretofore, the methods used for collecting current from a rectifying surface have been confined to a collector which congregates current from localized points of the rectifier plate, creating a concentration of current in and around the collector's contact surface. The result of such methods has been the overloading of the conducting elements at these localized points, creating an excessive heating condition which often results in the failure of the plate itself. According to the present invention the overloading of the current at localized points is minimized if not entirely eliminated, by means of a collector having contacts engaging the various sections substantially spread over the surface of the plate in a manner to allow air currents to flow freely around all the points of the collector thereby protecting the plate from excessive temperature at localized points.

Another object is to provide such a collector which will increase the mechanical strength of the rectifier plate. This is accomplished by the mechanical strength brought about by the extension of a number of arms to the various areas of the rectifier using a collector of this type to collect current from opposite sides of a rectifier plate the mechanical strength is further increased due to the force created by the two collectors acting against one another.

Another object is to provide an improved conductor element for paralleling two or more rectifiers of the dry plate type by means of a conductor strip formed into a U-shape or connected series of U-shapes which not only parallels and carries the current collected from a plurality of plates but at the same time acts as another means of dissipating heat which may be created in and around its contact surface, which provides a free circulation of air around this type of contact.

Another object is to provide an improved method of assembling and stacking of rectifiers of the dry plate type. While such rectifier plates have

2 been stacked, or assembled, on fiber rods, or other supporting rods of insulating material, along with other means of securing plates, the present invention has for an object to provide means for so assembling dry rectifier plates of any size, shape, or form, in order to obtain proper contact throughout the unit. Also, at the same time, through obtaining this more compact stack this condition automatically secures the stack as a whole, so as to provide stronger parts, and a stronger and compact unit.

Another object is to provide such an improved assembly which will effect more uniform pressure on the various elements so that the contacts will be brought uniformly and firmly together and at the same time eliminate the plurality of shorts, and other potentially harmful conditions, by having the proper contact assemblage and security.

Further objects, details and advantages of our improved rectifier will appear in the following description supplemented by the accompanying drawings, illustrating a highly satisfactory and preferred form of our invention and forming a part of this specification.

In the drawings our invention is illustrated in the various figures as follows:

Figure 1 is a side view of a multiple dry plate rectifier illustrating a circuit diagram for supplying a D. C. output for charging batteries and the like.

Figure 1:
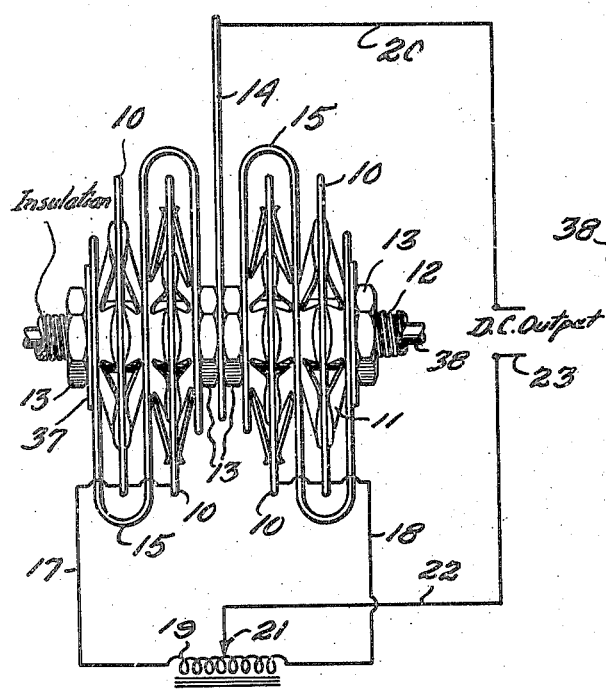

Referring to the drawings, our improved dry plate rectifier comprises, in general, a plurality of rectifier plates 10 spaced apart by current collecting contact elements 11 on a threaded fiber tube 12. These plates and contact elements are held thereon between a plurality of nuts 13 threaded onto tube 12 to maintain the rectifier elements and current collecting contacts assembled in proper operating condition.

As shown in Fig. 1 the rectifier is provided with a current conductor strip 14 arranged between the two innermost nuts 13 on tube 12 and a pair of U-shaped or sinuous current collector strip conductors 15 for each pair of dry rectifier plates 10 on the opposite sides of said innermost pair of nuts 13. These strip conductors 15 are arranged to engage the central faces of all of the current collecting contact elements 11 and electrically connect them with current conductor strip 14. Thus each collector strip conductor 15 provides a paralleling conductor, or contact, which is high electrical conductivity and of proper thickness and width to carry safely the total current output of the number of plates which are paralleled.

Figure 2:
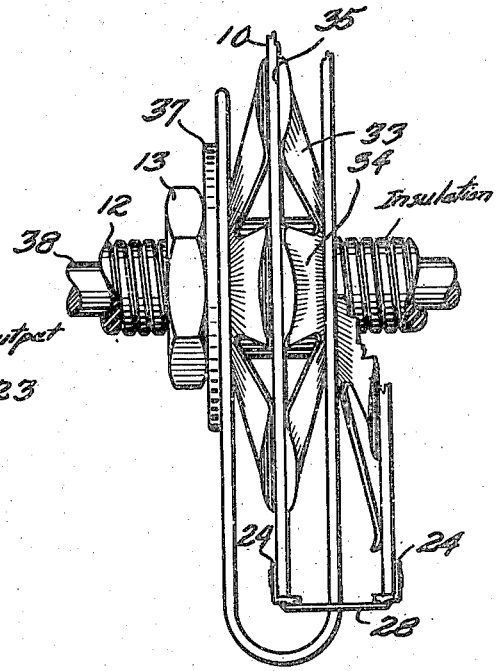
Figure 2 is a side view of one of the rectifier plates at the left end of Figure 1 on an enlarged scale so as to further details thereof.
Figure 6:
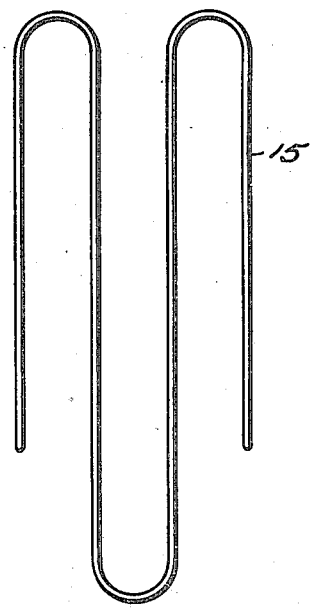
Figure 6 is a side elevation of a current collector strip conductor for collecting current from both sides of each of three rectifier plates instead of two as shown in Figure 1 or a single plate as shown in Figure 2.

This paralleling contact 15 is fabricated in a U-shape with a hole 16, or some other means of support at the desired points of contact on the rectifier supporting tube 12. If it should be desired to parallel more than one as shown in Fig. 2 or more than two plates as shown in Fig. 1, the paralleling contact may be extended as a continuation of the original U-shape as shown in Fig. 6 which is arranged to accommodate three plates and it may be further extended for still more plates for a higher current capacity.

Contact 15 of this shape adds to the compactness of the fabrication of the plate or plates as a whole, due to the fact the space which is utilized is governed by the thickness of the material used in the fabrication of the part.

Referring again to Fig. 1 it will be seen that in such a rectifier employing one or more rectifier plates on each side of current conductor strip 14, a preferred rectifying circuit arrangement is to connect the plates on the two sides by means of conductors 17 and 18 with the ends of a transformer winding 19. Conductor strip 14 is connected with a conductor 20 and a central tap 21 of transformer 19 is connected with a conductor 22; these conductors 20 and 22 lead to a D. C. output 23 for supplying full wave rectified current for battery charging and the like.

Figure 4:
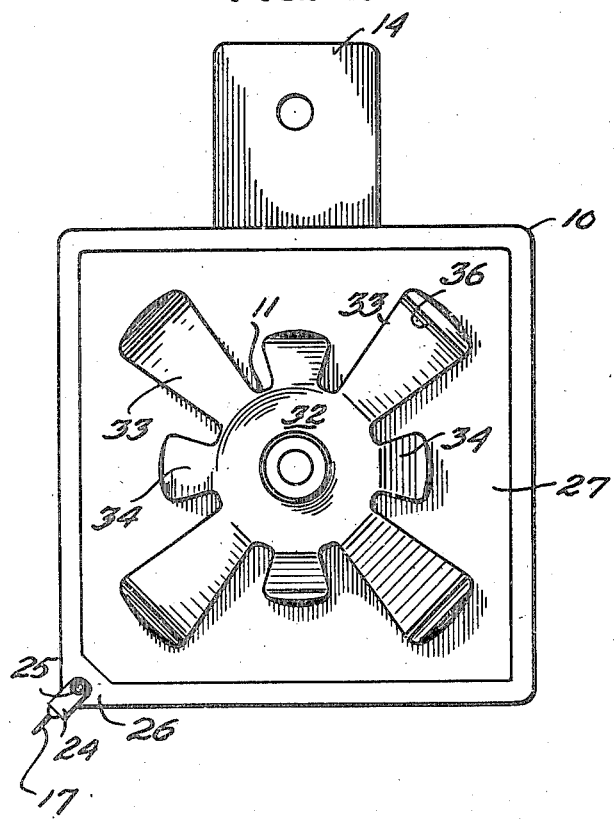
Figure 4 is a face view showing one of the rectifier plates and a current collector contact member.

Referring to Fig. 4 it will be seen that the connection of conductor 17 with plate 11 is preferably provided through the means of a clip 24 suitably secured thereto by means of a rivet 25, or by welding or otherwise, to an uncoated corner portion 26, it may be noted that the entire edge of the plate is uncoated surrounding the coated portion 27 which substantially covers each side of the plate 11. The coating of portion 27 provides for a unidirectional flow of current and may be of any desired composition though preferably consists of layers providing a double rectifying element as will appear in another application specifically covering such subject matter and therefore is not disclosed in detail or claimed in the present application.

As fragmentarily indicated in Fig. 2 when two or more rectifier plates 11 are to be connected in parallel a clip 24 of one plate is electrically connected with a similar clip of the next plate and such clips for each plate are secured together, soldered or otherwise electrically connected, to provide a connecting element 28 for connection with conductors (17 or 18) in an A. C. rectifier circuit.

Figure 3:
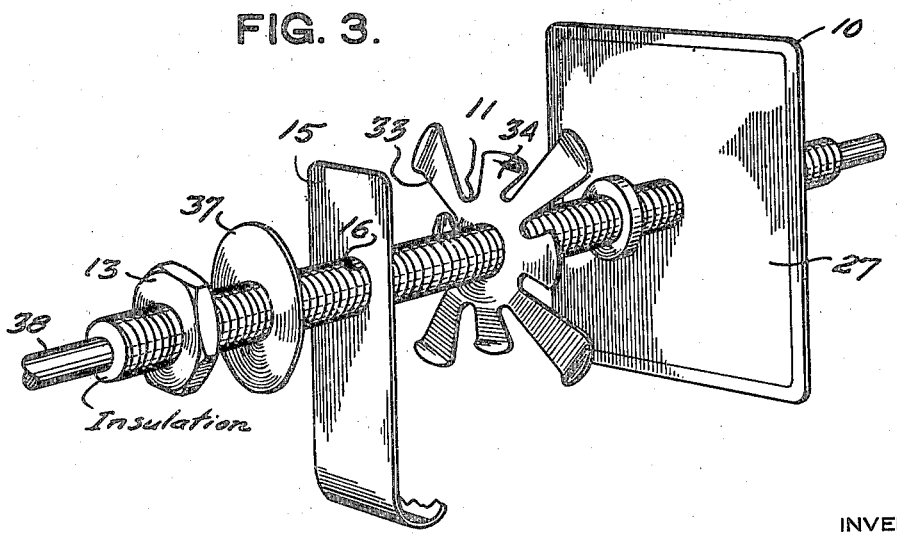
Figure 3 is an exploded perspective view of several of the parts or fragments of parts shown in Figure 2.
Figure 5:
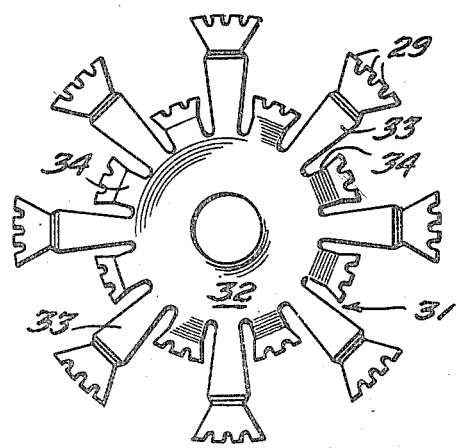
Figure 5 is a face view of a current collecting contact element of slightly modified contour.
Figure 7:
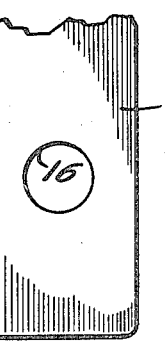
Figure 7 is a fragmentary face view of an end of a current collector strip conductor employed in the rectifier.

As shown in Figures 3, 4 and 5, current collecting contact element or collector 11 is formed into a spider-like shape. It preferably comprises a disk structure 32 having long and short legs 33 and 34 respectively, the legs being bowed from the central disk. These legs are bent adjacent to their outer ends so as to provide substantially flat end surfaces 35 for engaging the rectifying surface, the bends 36 thereof providing reinforcing portion for these tip engaging surfaces of the collector. However it is to be understood, that this collector can be formed into any desired shape or form, so as to have varied forms of ultimate contacts such as by claws 29 indicated in the form of collector 31 shown in Fig. 5, so long as the fundamental principle is retained, which is the collecting of current from separated points simultaneously from the rectifying surface 27.

Also, this collector is formed in such a manner as to allow the air current to flow freely in and around the legs 33 and 34. This is for the purpose of dissipating any excess heat that may be created due to the failure of any one of the contact surfaces, thereby protecting the plate from excessive temperature at localized points. It is constructed of metal which possesses high electrical conductivity and mechanical characteristics, including flexibility and springiness in order to allow the contact engagements to be made properly, and to serve the purpose of making a multiplicity of engaging contacts at the various points over the rectifying surface. This collector may be supported on the surface of the plate as hereinbefore set forth or in any other manner which may be desired to obtain said required results.

The legs of the spider-like construction may be flat and gain contact over considerable area; however, crimping of the legs allows the air flow free access to the entire plate. The legs are formed in such a manner that only a portion of the end which is parallel to the surface of the plate is allowed to contact the rectifying surface.

The central portion of the collector with the inner crimped contact points is automatically kept away from the rectifying surface when the short inner contacts are formed to make the proper contact engagement thus again eliminating concentration of current and allowing the air flow to reach the innermost section of the plate itself.

It will be seen that the long and short legs of the collectors 11 and 31 distribute the current collecting contacts over the surface of the rectifying surface of the rectifier plates 10 in a manner to equalize the current pick-up from the entire rectifying surface area. Also such arrangement provides for better cooling by the circulating air current than would be possible if the legs were of equal length or the pick-up points more centralized or closer together.

In assembling the rectifier plates and collectors 11 or 31 on the threaded fiber tube 12, it will be noted that as shown in Figs. 1, 2 and 3, that the various parts are placed on the tube against the inner pair of nuts 13, a washer 37 which may be of fiber or the like, placed against the outer portion of collector strip conductor 15 and an outer nut 13 is threaded onto tube 12 to draw the plates, collectors, and contacts together under pressure so as to assure uniform and firm contact engagements between the collectors and the rectifying surfaces of the plate and with the contact conductor strips.

This method of assembly eliminates the possibility of plates slipping at the extreme or outer ends due to the fact that the nuts are drawn tight on each end so as to maintain proper and uniform pressure throughout the entire unit.

While a fiber tube 12 is shown this method of assembling may be brought about by using any other material of the required dimensions and characteristics, and, threading said material so that the stack may be assembled thereon. However the fiber tube 12 has the advantage of providing for a means for supporting the rectifier, that is by means of a bolt 38 which is extended through tube 12. This bolt also adds strength to the tube and in view of the fact that the fiber tubing is not too strong, and the threading weakens it to some extent, it is desirable to have the bolt of sufficient size to add strength to the tube.

Having described a highly satisfactory form of rectifier in accordance with our intention it is not desired to have our invention limited to specific details of construction as set forth by way of example but what we claim and desire to secure by Letters Patent is:

1. A current collector for contacting the surface of a rectifier plate of a dry plate type of alternating current rectifier comprising a spider formation of conducting metal wherein a central disk portion has a plurality of radially extending legs of materially different lengths bowed from one side of the central disk, the tip ends of which legs provide contacts for engaging the rectifier plate at widely separated points over the surface thereof with the central disk and parts of the legs beyond the contact tip ends spaced from the rectifier plate to permit the flow of air therebetween.

2. A current collector for contacting the surface of a rectifier plate of a dry plate type of alternating current rectifier comprising a spider formation of conducting metal wherein a central disk portion has a plurality of radially extending legs of alternately short and long lengths bowed from one side of the central disk, the tip ends of which legs provide contacts for engaging the rectifier plate at widely separated points over the surface thereof with the central disk and parts of the legs beyond the contact tip end spaced from the rectifier plate to permit the flow of air therebetween.

3. A current collector for contacting the surface of a rectifier plate of a dry plate type of alternating current rectifier comprising a spider formation of conducting metal wherein a central disk portion has a plurality of radially extending legs of different lengths bowed from one side of the central disk, the tip ends of which legs are each of a claw formation for engagement with the surface of the rectifier plate in a group of points and the group of points of the several legs engaging the rectifier plate at widely separated areas over the surface thereof with the central disk and parts of the legs beyond the contact tip ends spaced from the rectifier plate to permit the flow of air therebetween.

4. A current collector for contacting the surface of a rectifier plate of a dry plate type of alternating current rectifier comprising a spider formation of conducting metal wherein a central disk portion has a plurality of radially extending legs bowed from one side of the central disk, the tip ends of which legs are bent outwardly and crosswise of the leg in a manner to reinforce the tip for contact engagement with the rectifying surface of the plate, with the points of engagement at separated points over the surface thereof and the central disk and parts of the legs beyond the contact tip ends spaced from the rectifier plate to permit the flow of air therebetween.

5. A rectifier for alternating currents including, a conducting plate having a rectifying surface thereon, and a current collector comprising a cup shaped disk element having a plurality of spaced alternately long and short legs extending outwardly therefrom with a contact on the end of each leg for engaging the rectifying surface of the plate, with such contact engagements at widely distributed points over the surface of the plate so as to afford large passageways for circulation of air between the plate and collector.

6. A rectifier for alternating currents including, a conducting plate having a surface coating thereon permitting the passage of electric current therethrough in one direction only, and a current collector comprising a cup shaped disk element with a plurality of legs of different lengths, each leg terminating with a contact for engaging the surface coating of the plate, whereby the current pick-up contacts are widely distributed over the surface area of the plate and afford large passageways for circulation of air between the plate and collector.

7. A rectifier for alternating currents including, a conducting plate having a surface coating on both sides thereof permitting the passage of electric current therethrough in one direction only, a current collector for each side of the plate each comprising a cup shaped disk element having a plurality of legs of different lengths, each leg terminating with a contact for engaging the surface coating of the plate, whereby the current pickup contacts are widely distributed over the surface area of the plate and afford large passageways for circulation of air between the plate and collector, said collectors arranged to engage the surface coatings on opposite sides of the plate with the cellector contacts in line with each other so as to engage substantially the same portions of the plate on the opposite sides thereof, and means for assembling the collectors in position with respect to the plate and apply uniform pressure thereon to assure the distribution of current pick-up by the collector contacts and prevent distortion of the rectifier plate by maintaining it in a flat condition.

8. In a rectifier for alternating currents comprising a plurality of spaced metal plates, each having current rectifying coatings on the opposite sides thereof, cup shaped disk current collectors each having a plurality of current pick-up contacts engaging distributed areas of the current rectifying coatings on the sides of each of the plates, and said metal plates and current collectors having aligned central bores therethrough, the improved assembly means which comprises; a threaded fiber tube extending through said bores of the metal plates and current collectors, and nuts on said threaded fiber tube clamping the metal plates and current collectors thereon under pressure.

9. In a rectifier for alternating currents comprising a plurality of spaced metal plates, each having current rectifying coatings on the opposite sides thereof, current collectors each having a plurality of spaced current pick-up contacts engaging distributed area of the current rectifying coatings on the sides of each of the plates, and said metal plates and current collectors having aligned central bores therethrough, the improved assembly and supporting means which comprises; a threaded fiber tube extending through said bores of the metal plates and current collectors, nuts on said threaded fiber tube clamping the metal plates and current collectors thereon under pressure, and a metal rod such as a bolt extending through said fiber tube rein- 10. A rectifier for alternating currents comprising a plurality of spaced metal plates, each having current rectifying coatings on the opposite sides thereof, cup shaped current collectors each having a plurality of alternately long and short legs terminating in current pick-up contacts so as to engage widely distributed areas of the current rectifying coatings on the side of each of the plates, said metal plates and current collectors having aligned central bores therethrough, a threaded fiber member extending through said bores of the metal plates and current collectors, nuts on said threaded fiber member clamping the metal plates and current collectors thereon under pressure, and a current collecting strip engagingly extending over each of the collector elements, said strip having apertures therethrough, through which said threaded fiber member extends and intermediate U-shaped portions extending around each plate beyond the edges thereof.

11. A rectifier for alternating currents comprising a plurality of spaced metal plates, each having current rectifying coatings on the opposite sides thereof, cup shaped current collectors each having a plurality of alternately long and short legs terminating in current pick-up contacts so as to engage widely distributed areas of the current coatings on the sides of each of the plates, said metal plates and current collectors having aligned central bores therethrough, a threaded fiber member extending through said bores of the metal plates and current collectors, nuts on said threaded fiber member clamping the metal plates and current collectors thereon under pressure, a pair of current collecting strips, each engagingly extending over each of a group of the collector elements, said strips having apertures therethrough, through which said threaded fiber member extends and intermediate U-shaped portions extending around each plate beyond the edges thereof, and a current conductor strip electrically connected with said current collecting strip.

12. A rectifier for alternating currents comprising a plurality of spaced metal plates, each having current rectifying coatings on the opposite sides thereof, cup shaped current collectors each having a plurality of alternately long and short legs terminating in current pick-up contacts so as to engage widely distributed areas of the current rectifying coatings on the sides of each of the plates, said metal plates and current collectors having aligned central bores therethrough, a threaded fiber member extending through said bores of the metal plates and current collectors, nuts on said threaded fiber member clamping the metal plates and current collectors thereon under pressure, a current collecting strip engagingly extending over each of the collector elements, said strip having apertures therethrough, through which said threaded fiber member extends and intermediate U-shaped portions extending around each plate beyond the edges thereof, and current conducting connecting elements electrically connecting the metal plates adjacent to their edges beyond the current rectifying coatings on their side surfaces.

13. A rectifier for alternating currents comprising a plurality of spaced metal plates, each having current rectifying coatings on the opposite sides thereof, cup shaped current collectors each having a plurality of alternately long and short legs terminating in current pick-up contacts so as to engage widely distributed areas of the current rectifying coatings on each side of each of the plates, said metal plates and current collectors having aligned central bores therethrough, a threaded fiber tube extending through said bores of the metal plates and current collectors, nuts on said threaded fiber tube clamping the metal plates and current collectors thereon under pressure a metal rod such as a bolt extending through said fiber tube reinforcing the same and providing a supporting means for the rectifier, a current collecting strip engagingly extending over each of the collector elements, said strip having apertures therethrough, through which said threaded fiber member extends and intermediate U-shaped portions extending around each plate beyond the edges thereof, current conducting connecting elements electrically connecting the metal plates adjacent to their edges beyond the current rectifying coatings on their side surfaces, and a current conductor strip electrically connected with said current collecting strip.

14. A current collector for contacting the surface of a substantially square rectifier plate of a dry plate type of alternating current rectifier comprising a spider formation of conducting metal wherein a central disk portion has at least eight radially extending legs bowed from one side of the central disk, the tip ends of which legs provide contacts for engaging the rectifier plate, four of said legs being of a length for their tips to engage areas of the plate adjacent to the corners and the other four legs alternating with the four legs just mentioned being shorter so that their tips engage areas of the plates intermediate the corners and nearer the central portion thereof.

ALBERT C. FLETCHER.
DONALD LLOYD.

REFERENCES CITED

The following references are of record in the file of this patent:

UNITED STATES PATENTS

| Number | Name | Date |
|---|---|---|
| 1,323,188 | Humphris | Nov. 25, 1919 |
| 2,046,153 | Dowling | June 30, 1936 |
| 2,133,745 | Harty | Oct. 18, 1938 |
| 2,134,131 | Kipphan | Oct. 25, 1938 |
| 2,157,895 | Hein | May 9, 1939 |
| 2,172,887 | Hartley et al. | Sept. 12, 1939 |
| 2,205,897 | Brunke | June 25, 1940 |
| 2,221,616 | Smith | Nov. 12, 1940 |
| 2,302,087 | Addink | Nov. 17, 1942 |
| 2,309,081 | Priessman et al. | Jan. 26, 1943 |

FOREIGN PATENTS

| Number | Country | Date |
|---|---|---|
| 318,265 | Great Britain | Dec. 1, 1930 |
| 556,545 | Great Britain | Oct. 18, 1943 |